United States Patent
Payton et al.

(10) Patent No.: US 6,580,979 B2
(45) Date of Patent: Jun. 17, 2003

(54) METHOD AND APPARATUS FOR TERRAIN REASONING WITH DISTRIBUTED EMBEDDED PROCESSING ELEMENTS

(75) Inventors: David W. Payton, Woodland Hills, CA (US); Craig Lee, Redondo Beach, CA (US); Bruce Hoff, Venice, CA (US); Mike Howard, Westlake Village, CA (US); Mike Daily, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 09/903,878

(22) Filed: Jul. 10, 2001

(65) Prior Publication Data

US 2002/0138247 A1 Sep. 26, 2002

Related U.S. Application Data

(60) Provisional application No. 60/217,232, filed on Jul. 10, 2000, and provisional application No. 60/217,226, filed on Jul. 10, 2000.

(51) Int. Cl.[7] .......................... G06F 13/00; G08G 1/00; G01S 13/93
(52) U.S. Cl. .......................... 701/25; 701/202; 709/313; 709/317
(58) Field of Search .......................... 701/25, 202, 209; 455/518, 456, 507, 517, 521; 709/317, 313, 202

(56) References Cited

U.S. PATENT DOCUMENTS

| | | | |
|---|---|---|---|
| 4,028,533 A | 6/1977 | Matsubara | 235/151 |
| 5,233,604 A | 8/1993 | Ahmadi et al. | 370/60 |
| 5,421,013 A * | 5/1995 | Smith | 395/650 |
| 5,561,790 A | 10/1996 | Fusaro | 395/500 |
| 5,675,741 A | 10/1997 | Aggarwal et al. | 395/200.12 |
| 5,724,648 A * | 3/1998 | Shaughnessy et al. | 455/56.1 |
| 5,870,303 A | 2/1999 | Trovato et al. | 364/167.07 |

(List continued on next page.)

FOREIGN PATENT DOCUMENTS

| | | |
|---|---|---|
| EP | 0526969 | 2/1993 |
| EP | 0542561 | 5/1993 |
| JP | 07271434 | 2/1996 |

OTHER PUBLICATIONS

D. W. Gage, "Command and Control for Many–Robot Systems", In the Nineteenth Annual AUVS Technical Symposium (AUVS–91), Huntsville, AL, Jun. 22–24, 1992. Reprinted in Unmanned Systems Magazine, 10(4):28–34, Fall 1992.

D. W. Gage, "Many Robot Systems", SPAWAR web page, http://www.nosc.mil.robots/research/manyrobo/many-robo.html.

*Primary Examiner*—Tan Q. Nguyen
*Assistant Examiner*—Dalena Tran
(74) *Attorney, Agent, or Firm*—Tope-McKay & Associates

(57) ABSTRACT

A method and apparatus for computing properties of a physical environment is provided, using a plurality of agents forming a distributed network embedded within the environment. The method comprises determining an initiating agent 200, transmitting a signal including a cumulative cost value to neighboring agents 202, and processing the signal at each neighboring agent to augment the cumulative cost value with local information 204. If multiple signals are received, determining which has the best cumulative cost value for generating a new signal 206, then treating the neighboring agent as an initiating agent 208 and transmitting the new signal to neighboring agents 208 and retaining the best augmented cost value in memory 210. Methods further include determining paths using shortest path computations, using dual gradients for aligning agents on a path between two reference agents, and discovering and converging agents on choke points.

36 Claims, 10 Drawing Sheets

U.S. PATENT DOCUMENTS

| | | | |
|---|---|---|---|
| 5,946,083 A | 8/1999 | Melendez et al. | 356/73 |
| 5,991,300 A | 11/1999 | Tappan | 370/392 |
| 6,154,139 A | 11/2000 | Heller | 340/573.4 |
| 6,195,020 B1 | 2/2001 | Brodeur, Sr. et al. | 340/933 |
| 6,208,247 B1 | 3/2001 | Agre et al. | 340/539 |
| 6,292,725 B1 * | 9/2001 | Kageyama et al. | 701/30 |
| 6,311,129 B1 | 10/2001 | Lin | 701/214 |
| 6,415,315 B1 * | 7/2002 | Glass | 709/201 |
| 6,445,308 B1 * | 9/2002 | Koike | 340/902 |
| 6,477,387 B1 * | 11/2002 | Jackson et al. | 455/519 |

* cited by examiner

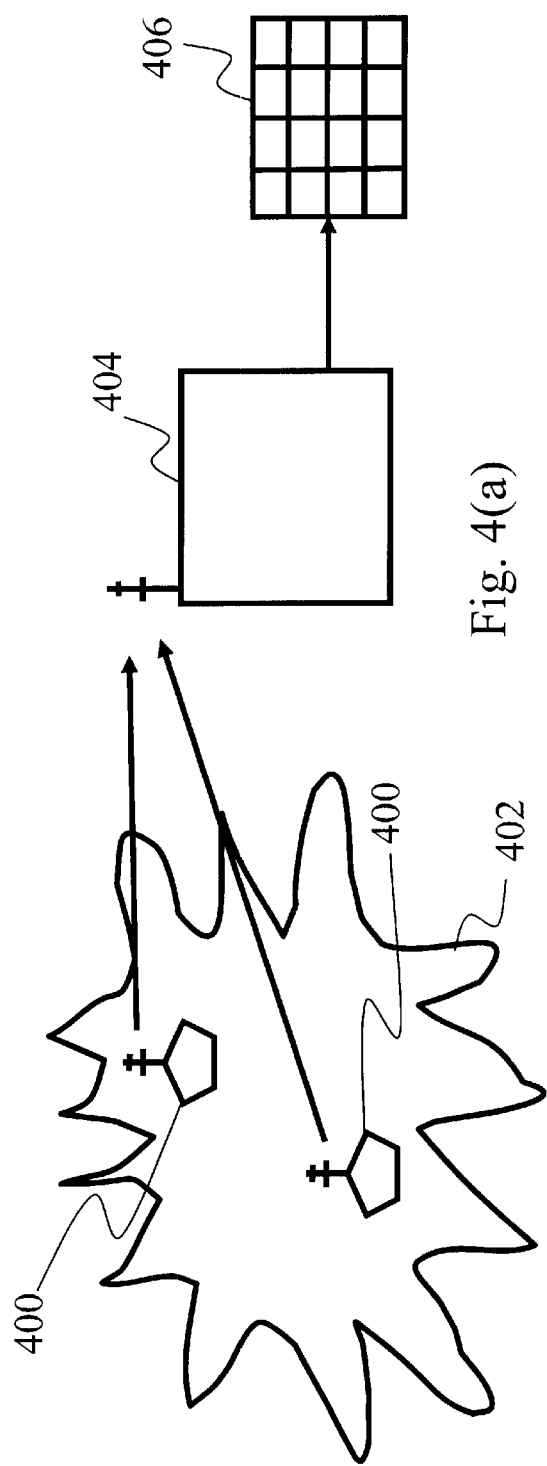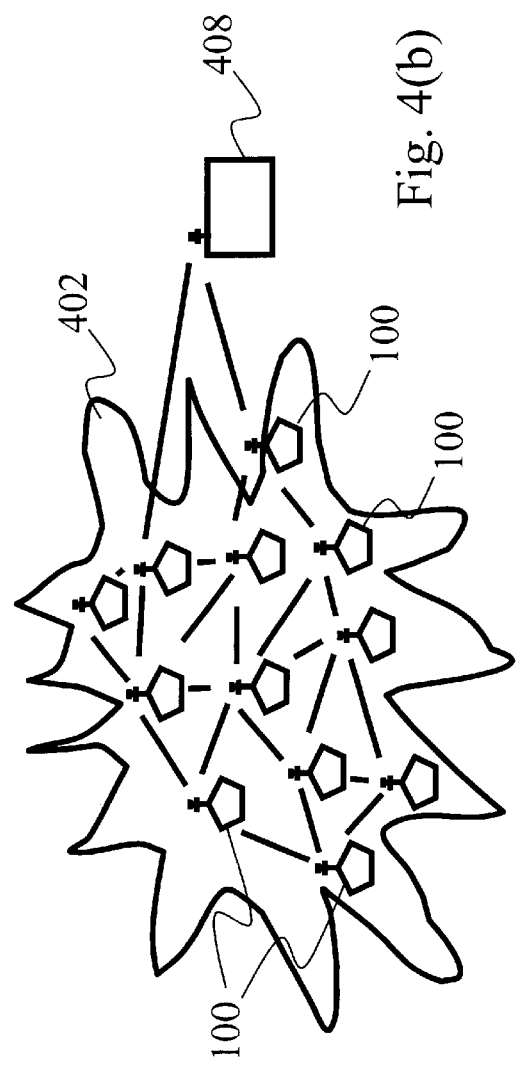

METHOD AND APPARATUS FOR TERRAIN REASONING WITH DISTRIBUTED EMBEDDED PROCESSING ELEMENTS

PRIORITY CLAIM

This application claims the benefit of priority to provisional applications No. 60/217,232, filed in the United States on Jul. 10, 2000, and titled "Emergent Movement Control for Large Groups of Robots" and No. 60/217,226, filed in the United States on Jul. 10, 2000, and titled "Terrain Reasoning with Distributed Embedded Processing Elements".

STATEMENT OF GOVERNMENT RIGHTS

This invention is related to work performed in contract with the U.S. Government under DARPA ITO Contract #N66001-99-C-8514, "Pheromone Robotics", and the U.S. Government may have certain rights in this invention.

TECHNICAL FIELD

The present invention is related to the field of computing properties of a physical environment. More specifically, this disclosure presents a method for computing properties of a physical environment using a plurality of agents forming a distributed network embedded within the environment.

BACKGROUND

Over the past decades, approaches to path planning and terrain analysis have focused on single or parallel processor solutions operating on an internal map containing terrain features. Traditional terrain analysis came in one of two forms: 1) a single mobile agent (e.g. a robot), or a small number of agents, collecting terrain information on-the-fly and/or using a pre-constructed digital map to aid in path planning or other terrain-related decision making, and 2) simulated terrain-embedded entities (e.g. military vehicles in a simulated battlefield or simulated opponents in a computer game) referring to a terrain/environment database (which is an integral part of such simulations) as a pre-constructed map available for their geometric computations. Typical computations include determination of the shortest path to a destination, of high visibility locations in the terrain, and of routes concealed from known opponent locations. In these traditional approaches to route planning and terrain reasoning, relevant data are taken from the real world to build a map readable by a machine. Terrain/environmental reasoning based on local sensing provides very limited access to environmental information. The natural solution is to pre-construct a map of the environment, which provides much more information and may be updated by information from a robot's own sensors. Such maps are usually represented by an array of terrain features including traversability and blocked routes that can be translated into a corresponding array of mobility costs representative of the difficulty and expense to move across a particular terrain path. The cost array can then be analyzed to obtain a new map, which indicates minimum cost paths between designated points on the map. In this traditional approach, the separate and distinct steps of sensing environmental features of the area, transmitting data to a central point, and generating a map must be performed before any minimum cost path computations can take place. As a result, it is often difficult to determine up to date minimum cost paths in situations where the environment is rapidly changing, or where sensing and map generation cannot be performed on a timely basis.

Current means of mapping a space include use of a few powerful mobile robots moving through an environment in a search pattern, sending raw or partially processed data back to a central computing resource. The central resource compiles a map and then operates on it. Dynamic changes to the environment are not picked up unless the robots repeat their search. Some communication networks perform computations to determine lowest cost paths for communications purposes (e.g., to minimize transmission energy or delays due to signal retransmission). These approaches are concerned specifically with communication issues, and they do not attempt to draw any correspondence between communications efficiency and properties of the environment that might impact mobility. Relevant information to some of these approaches can be found in U.S. Pat. Nos. 5,561,790 and 5,233,604.

Thus, it would be desirable to provide a means for determining optimal paths over or through an area of an environment by using a large number of small, inexpensive agents, requiring only local communications with neighboring agents. Signals would be transmitted across paths through the plurality of agents in a series of hops in a manner that provides, at each agent, a local representation of the cumulative non-local properties along a path. The information in the agents could be quickly updated by transmitting another signal along the path.

SUMMARY OF THE PRESENT INVENTION

The invention disclosed herein provides a method and apparatus for computing properties of a physical environment using a plurality of agents deployed within the physical environment. Each agent deployed comprises, a communication capability, a processor coupled with the communication capability, and a memory connected with the processor. The plurality of agents makes use of physical properties of inter-agent communication in order to form a distributed representation of non-local properties of the physical environment. The method of the present invention comprises the steps of of triggering at least one initiating agent; transmitting a signal from the initiating agent to agents neighboring the initiating agent; processing the signal at each of the neighboring agents with a cost value based on local properties along the respective path between the initiating agent and each neighboring agent; selecting, from the signals received, a new signal to transmit; treating the neighboring agent as an initiating agent of the processed signal, and repeating the transmitting and processing steps; and at each agent, locally retaining at least one cumulative cost value representing information regarding non-local properties of the physical environment based on signals received. Thus, as a signal propagates. from an initiating agent to each agent among the plurality of agents, a cumulative cost value is stored at each agent in order to provide a measure of the quality of the best path from that agent to the initiating agent.

The cost value may be represented as a simple hop count, iterated with each hop as the signal propagates across the plurality of agents from the initiating agent. The cumulative cost value is typically used to determine from the signals received, the new signal to transmit. Additionally, cost values may be retained from past signals and compared with the cost value from the current signal in order to determine the cost value with which to process the signal. The signals are typically passed along line of sight paths, which provide a general representation of the traversability along a path.

The agents may also be augmented by providing them with a means for storing the direction from which a particular signal was received across a communication path, and the cost values for different paths between two agents may be stored along with the corresponding direction to the path with the best cost.

Additionally, the cost values may be time stamped as they are retained in the memory of the agents, with the most recently retained cost value being designated for use in processing the signal, and with the cost values being removed from memory after a predetermined time has elapsed. The cost values may also be ranked from best to worst over time, with the best cost value used in processing the signal. In this case, when the time stamp of a cost value designated for use in processing the signal expires and the cost value is removed from memory, the next best cost value is designated for use in processing the signal.

In another embodiment of the present invention, the agents may be configured to perform an alignment, wherein two agents are selected from among the plurality of agents to act as reference agents; cost gradients comprising vector representations of an optimal cost path between each agent among the plurality of agents and each reference agents are generated; the vectors are summed at each agent to create a motion vector for the agent; and the agents are moved along the motion vector in order to align the agents along a path between the reference agents. The alignment step may be triggered upon the occurrence of a triggering event such, for example, the detection of an intruder. Once the agents have aligned along a path, they may be converged to a choke point by selecting a convergence agent and urging the other agents toward the convergence agent, resulting in a local clustering of agents near the convergence agent.

The agents may also incorporate sensors connected with their processors in order to provide additional information to the processor for the generation of the cost value. For example, a smoke detector could be used to factor the smokiness of an area into the cost value along a path.

Agents designed for use with the present invention may incorporate the logic used in performance of the present invention in the form of software, or the logic may be encoded in hardware.

BRIEF DESCRIPTION OF THE DRAWINGS

These and other features, aspects, and advantages of the present invention will become better understood with regard to the following description, appended claims, and accompanying drawings where:

FIG. 4(a) is an illustrative diagram depicting a conventional map-based approach to terrain reasoning;

FIG. 4(b) is an illustrative diagram depicting the terrain reasoning approach of the present invention in contrast with the conventional approach shown in FIG. 4(a);

DETAILED DESCRIPTION

Figure 1:
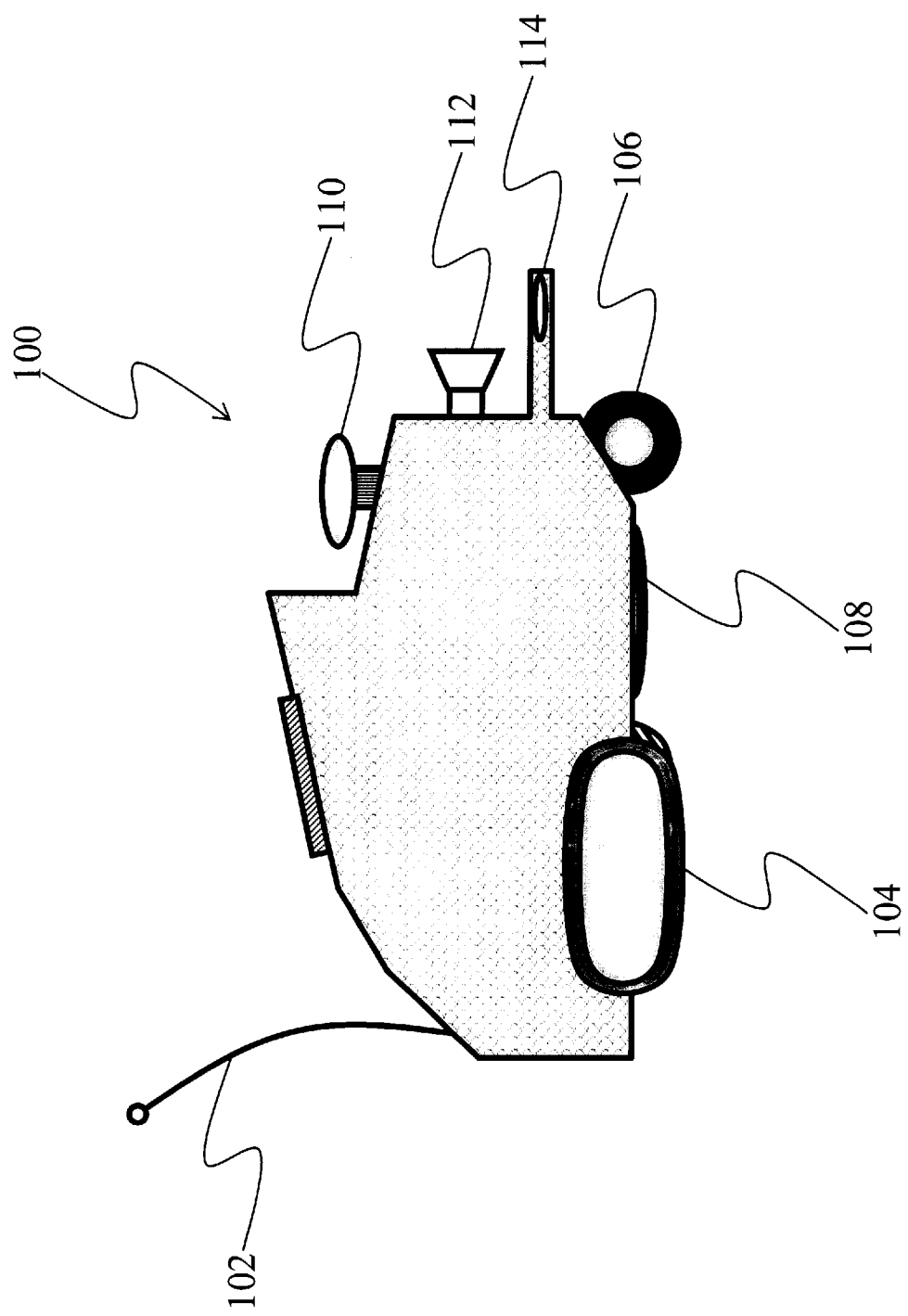
FIG. 1 is an illustration of an example of a typical agent used in conjunction with the present invention.

The present invention relates to the field of computation of properties of a physical environment. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In order to provide a working frame of reference, first a glossary of terms used in the description and claims is given as a central resource for the reader. Then, a brief introduction is provided in the form of a narrative description of the present invention to give a conceptual understanding prior to developing the specific details.

Glossary

Before describing the specific details of the present invention, it is useful to provide a centralized location in which various terms used herein and in the claims.

Agent—As described herein, the term agent indicates a unit comprising, in its most general sense, a processor, a communication capability, and a memory. The agent can also include one or more means for movement, a means for detecting the direction to other objects in the agent's coordinate system (such as a compass, a directional transmitter/receiver, etc.), a distance measuring device (such as a laser, infrared, sonic, or radar range finder) and one or more sensors. In more tangible terms, the agent could, for example, be a robot with an infrared transmitter/receiver and a set of wheels, where the infrared transmitter/receiver is used to gauge the distances and directions between the robot and other robots. In a more complicated situation, the same robot could also include an antenna for sending and receiving radio communications, a group of sensors for sensing various aspects of the environment (such as temperature, visibility, etc.), and alternate movement means such as wings and a propeller for flying, etc.

Choke Point—In some circumstances, it may be desirable to move a group of agents toward a point. For example, if an intruder is moving about an area, multiple agents may be sent to the vicinity of the intruder. On the other hand, in an area with narrow corridors, it may be desirable to limit the passage of an intruder. Thus, agents can be sent to the vicinity of a corridor along the path of the intruder in order to limit the movement of the intruder. Thus, a choke point is generally a convergence of a group of agents about a selected agent, and can be used to block passageways or to deploy a group of agents tightly in a selected locality.

Communication Capability—The term communication capability as utilized herein generally refers to a local signaling mechanism to facilitate communication between an agent and its local neighbors. Any signaling mechanism applicable to a particular environment may be used. For example, in clear air, directional infrared signaling mechanisms may be particularly useful because of their directionality. On the other hand, in water or liquid environments, acoustic signaling mechanisms may be more useful.

Cost Value—The term cost value indicates a measure of one or more physical properties along a path between agents. For example, in a very simple case, the cost value may be a measure of whether a signal was able to transmit from one agent to another, and if so, a hop count could serve as the cost value. On the other hand, a more complex cost value could be developed (for example) as a weighted sum of several physical properties, non-limiting examples of which include signal transmission quality, temperature, wind speed, and the angle of the path between the agents. Many cost value schemes could be developed, depending on the needs of the particular embodiment. The term local cost value is intended to refer to a measure of local environmental conditions along the communication path between two agents. The term cumulative cost value is intended to refer to a measure of the non-local environmental conditions along a path between more than two agents. Although the terms local cost value and cumulative cost values are defined here, the exact application of the term may also be inferred from its context. Also, the cost values generated at each agent in the plurality of agents in response to a signal transmitted by an initiating agent form a cost gradient pattern across the plurality of agents. Combined with directional information, the cost gradient pattern has many characteristics of a directed graph, and many computations that may be performed using a directed graph may be applied to the plurality of agents.

Local—Agents within direct (usually line of sight) communication and sensing range of an agent are considered to be local and are termed neighbors of that agent. The number of local (neighbor) agents to a given agent may vary depending on the number of agents present in a given area. It is desirable to use signaling only between local agents to conserve transmission power. In regard to its use with respect to properties of the environment, properties that are local to an agent are properties that can be sensed by the agent. Non-local physical/environmental properties with respect to an agent generally refer to those physical/environmental properties that the agent cannot directly sense.

Means providing mobility—In order to provide the mobility necessary to move about in the environment (assuming that movement is desirable), the agents need something to facilitate the mobility. Any known and controllable movement mechanism may be used, as suitable for the environment in which the agent is used. For example, on land, an agent would typically have legs or wheels, whereas in the air, an agent might have a propeller and wings. On the other hand, in liquid environments, the agent would be equipped with a propeller and fins, where in space, the agent would be equipped with jets or rockets. The means for providing mobility is coupled with, and controlled by, the processor.

Sensors—In addition to the means for detecting distance and direction from other agents, the agents may be equipped with sensors coupled with their processors for collecting information regarding their environment as well as regarding the status of the agent. Non-limiting examples of sensors that may be used with the agents of the present invention include smoke detectors, sound detectors, visual sensors, seismic detectors, heat/infrared detectors, chemical sensing devices, and GPS sensors. The sensor information may be incorporated into the cost value along a path or may be used to trigger various behaviors of the plurality of agents such as congregation to a choke point.

Introduction

The present invention generally provides a means for using a plurality of agents distributed in an area to perform topological computations on the area. The properties may be determined by creating a pattern of communications between nearest neighbors, wherein a source agent transmits a signal including a cumulative cost value to each of its neighboring agents. Each neighboring agent receives the signal from the source and modifies the cumulative cost value based on the physical properties between the source and the respective neighboring agent, and transmits a new signal to its neighbors incorporating the modified cumulative cost value.

As the signal propagates through the plurality of agents, a single agent may receive signals with cumulative cost values from more than one of its neighboring agents. Depending on the particular embodiment, the single agent determines the best cumulative cost value among those received and then modifies the best cumulative cost value for incorporation into a new signal; or the agent can modify all of the cumulative cost values and then determine the best cumulative cost value for incorporation into a new signal. The cumulative cost values represent non-local properties of the environment (e.g., properties of the physical environment the receiving agent cannot sense directly). After modification, the agent stores the best cumulative cost value and generates a new signal for transmission to its neighbors.

As a more tangible example, a plurality of agents could be utilized to perform a search for a fire (or other objects such as land mines, intruders, etc.). While a user waits at a particular location, the detection of a fire by an agent triggers the propagation of a signal from the detecting agent across the plurality of agents to the user. Because multiple paths with cumulative cost values are available at any given location among the plurality of agents, the user is provided with an optimal path to the fire (e.g., fastest, safest, etc.). The best path may simply be designated as the path along which the signal has performed the smallest number of hops en route to the user (as a rough determination of the distance). On the other hand, the best path may be a function of more complex information such as that derived from sensors on board the agents along the path.

Generally, once an initiating agent begins propagating a signal across the plurality of agents, the signal is modified at each signal hop between the initiating agent and the each receiving agent. The modification has the purpose of incorporating information regarding the properties of the physical environment across the latest transmission hop, and can be as simple as updating a hop count or as complex as adding sensor information or the results of local computations. The information regarding the physical environment along each path may simply provide a measure of the quality of the path, or it may include separable parts to determine the specific features along individual hops in the path. In either case, the cumulative signal embodies a representation of the quality of the best path. The propagation of the signal between an initiating agent and a receiving agent is, in essence, a distributed computation which occurs across the path between the initiating agent and the receiving agent in order to provide, at each step, a local summary of the non-local properties along the path.

The level of detail of the information regarding the properties of the environment along a path can vary widely, depending on the particular embodiment. For example, one of the simplest ways of determining the properties of the environment is to utilize the presence or absence of the ability to transmit a signal between two agents along with a count of the hops between the initiating agent and the receiving agent along paths where transmission was successful. A slightly more complicated method is to use the strength of a signal received across a hop as a measure of the quality of the path along the hop. This may give a more accurate way of determining distance. Still more complicated methods include using sensors on board the agent to determine properties of the physical environment and incorporating them into the signal. In this sense, the cumulative cost value incorporated into the signal may serve as a weighted sum of the properties across the transmission path. An agent may receive multiple signals en route from the initiating agent to the receiving agent. In this case the agent will select the signal representing the most favorable path for re-transmission to its neighbor agents.

In essence, a measure of the quality of the path along a hop between one agent and another may be thought of as a cost value, where the lower the cost, the better the path. In the case where the quality of a path is determined simply from the hop count to that point, the cost value along the most recent hop is a binary on/off function representing whether the signal was able to cross the path. The cumulative cost values of multiple paths are compared to determine the best path. Again, in the simple hop count example, for each hop where the signal is successfully transmitted, the cumulative cost value is incremented by one, with the path having the lowest cumulative cost value being considered optimal (assuming that the shortest, or lowest hop, path is the most desirable). The concept of a cost value may be extended to other embodiments, such as those used in conjunction with other sensors, where the cumulative cost value may be a more complex measure, potentially incorporating many aspects of the environment. In environments where change is likely, the cost value can be designed to expire after a certain amount of time, possibly being replaced with the next-best older (historical) cost value.

In addition to simply determining the quality of a path between two agents, two agents may be selected to simultaneously initialize the transmission of a signal across the plurality of agents. Preferably each of the two agents would transmit their signal in a uniquely identifiable way (e.g., on different frequencies, with different signatures, etc.). Each of the plurality of agents receiving the signal then develop vectors representing the quality and direction of the best path to each of the two agents and move according to the two vectors in order to line up on a path between the two agents. The selection of the two agents may be performed explicitly by a user, or it may be performed by propagating a message from an agent along a path to a second (predetermined) agent upon the occurrence of a triggering event. Next, another agent is selected from among the lined up agents to act as a convergence point for other agents, and the agents lined up on the path are urged toward the convergence point. The usefulness of this behavior is exemplified in the case where a fire is detected in one area of a building. The agent detecting the fire may signal to other agents to find a narrow corridor near the fire. Once a narrow corridor is found (possibly by querying nearby agents to determine those encountering the greatest movement restriction), a path through the corridor to another agent on the other side of the corridor is determined. Next, another agent along the path is selected to transmit a signal, with other agents moving to line up along the path. The agent in the narrow corridor then signals for fire-blocking agents along the path to move to the corridor, where they can apply a limited amount of a fire-blocking chemical in an attempt to cut the fire off from other parts of the building.

Now that the general nature of the present invention has been described, the specifics of the present invention will be described with reference to the figures.

Specifics of the Present Invention

First, a description and illustration of a typical agent used with the present invention is provided. Next, the methods of using the agents in order to determine a best path route from an initiating agent and another, arbitrarily selected, agent and of using two agents as reference agents in order to assist other agents in converging on a choke point are discussed with reference to several flowcharts. Finally, illustrations are provided to graphically demonstrate various aspects of agent coordination.

A typical agent used with the present invention is depicted in FIG. 1. As shown, the agent 100 includes a communication capability 102 for transmitting and receiving signals, shown as an antenna. Internally, the agent 100 includes a memory and a processor for processing received signals and data regarding the environment as well as for controlling a means for providing mobility such as a set of tracks 104 or wheels 106. The agent 100 also may include one or more sensors, non-limiting examples of which are shown, including a metal detector 108, a GPS receiver 110, an infrared detector 112, and a gas chromatograph 114. An agent 100 may be adapted for use within a particular environment or for the detection of particular properties of an environment. The agents 100 are used to compute the properties of a physical environment, and to develop a distributed representation of the non-local properties of the physical environment.

The agents are deployed in an area of the physical environment such that each agent 100 is within communication range of at least one other agent 100, with the local neighbor agents of a given agent being defined as those agents 100 within direct (non-relayed) communication of the given agent. The plurality of agents 100, as a whole, forms a distributed network of communicating processors. Preferably, the agents 100 are deployed in such manner that they are approximately evenly spaced throughout a desired area to maximize their ability to cover the area effectively. Deployment of the agents can take place by any means desirable for a particular environment. For example, if the agents are mobile, various algorithms may be used to ensure the agents 100 move to locations where they are each equidistant from other agents 100. If the agents are not mobile, they may be distributed in a semi-random fashion (e.g., dropping them out of an airplane), or they may be more carefully placed in position. Hybrid mobility situations may also exist, where only a portion of a group of agents 100 is mobile.

Figure 2:
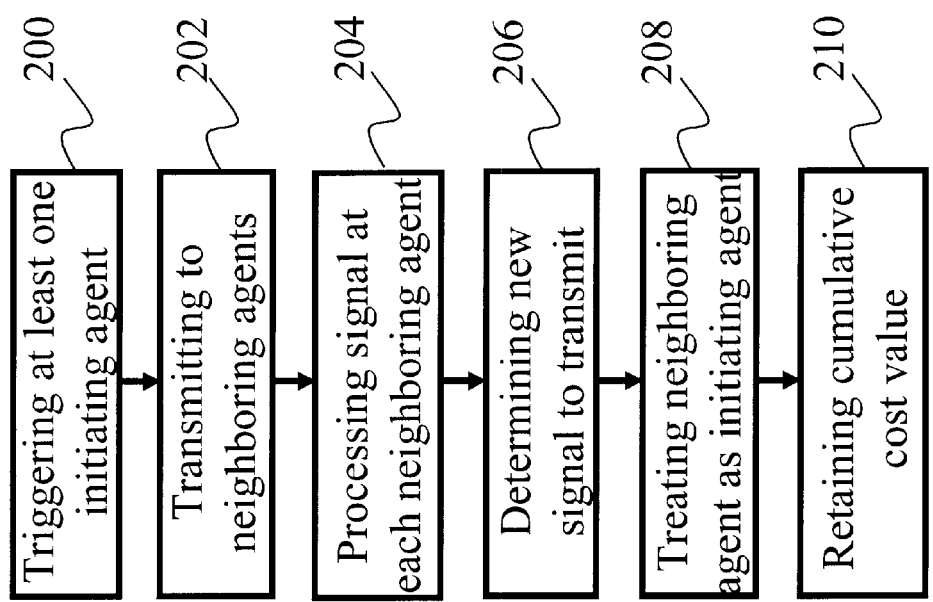
FIG. 2 is a flow diagram depicting the steps in the method of the present invention, demonstrating a method for determining a best cost value path to at least one initiating agent.

A goal of the present invention is to determine optimal paths from an initiating agent to any other agent among the plurality of agents. FIG. 2 presents a flow diagram of the method of determining the optimal paths beginning with the step of determining at least one initiating agent 200, in which an agent begins transmitting a signal to be propagated through the plurality of agents. The initiating agent may be determined explicitly by a command from a user of the agents. For example, the user may use a remote control such as a laser pointer or a radio signaling device to select an agent from which to begin propagating a signal. Alternatively, the initiating agent may be determined implicitly by an event. For example, the agents may include sensors, such as a smoke detector, and upon detection of smoke by an agent, the detecting agent may be designated as the initiating agent. The precise mechanism by which an agent is determined as an initiating agent is not of particular importance.

After the initiating agent is determined, it transmits a signal to neighboring agents in a transmitting step 202. As previously mentioned, neighboring agents are considered to be those agents within communication range of any arbitrary agent. Generally, each one of the plurality of agents will have at least one neighboring agent.

The signal is then received at the neighboring agents and is processed with a cost value associated with the respective path between the initiating agent and the neighboring agent in a signal processing step 204. The cost value may be based on transmission-related local properties along the path such as the hop count along the path or the transmission quality afforded by the path (in a simple case, the cost value may be based on whether agents are able to communicate along line of sight communication paths); or it may be based on local properties of the environment near the agent such as temperature, humidity, and smokiness. Virtually any local property of the environment may be incorporated into the determination of the cost value. Furthermore, weighted combinations of multiple properties may be used.

Next, each agent receiving signals determines, based on the signals received, a new signal to transmit. The determining step 206 may be performed either before the signal processing step 204 or afterward, depending on the particular embodiment. The decision regarding the new signal to transmit is generally based on a comparison of the cost values of the signals received from the agent's neighbors. For example, if the goal was to determine the lowest hop count path from the initiating agent, in preparing to propagate the signal, an agent along the path would compare the signals received from its neighbors to determine the signal with the smallest hop count. The agent would then increment the hop count and transmit a new signal to its neighbors indicative of the incremented hop count.

After determining the new signal to transmit, an agent, in essence, becomes like a new initiating agent in a treating step 208, and transmits the new signal to its neighbors. These steps repeat in order to propagate a signal across the plurality of agents.

As a signal is propagated, a cumulative cost value is retained in memory at each agent in a retaining step 210. The cumulative cost value provides, at each agent, a local summary of the non-local features along a path toward the initiating agent, and also provides a mechanism to prevent back propagation of a signal. For example, in many configurations, agents may broadcast in an omni-directional manner. Therefore, after a first agent has transmitted a signal representing its current cost value, a neighboring agent will receive the signal and transmit a new signal representing the cost value at the neighboring agent. Because the transmission from the neighboring agent is omni-directional, the new signal will be received by the first agent. Assuming the cost value of the neighboring agent (which was derived from that of the first agent) is less desirable than that of the first agent, the first agent will retain its cost value and will not utilize the cost value of the neighboring agent. Thus, the propagation of signals from an initiating agent is directed generally away from the initiating agent.

The cumulative cost value at any given agent represents a cumulative measure of the quality of the path that the signal has crossed en route from the initiating agent. Thus, the cumulative cost value serves as a local representation (at the agent) of the non-local properties (with respect to the agent) along the path between the initiating agent and any given agent.

In some cases, it may be desirable to compare the retained cost value with the cost value received from a signal to determine which to use in determining from the signals received, the new signal to transmit. Thus, the best cumulative cost value received at each agent may be retained, and each time a signal is passed to the agent, the received cumulative cost value may be compared with the retained cost value in order to determine which is higher. For this to occur, it is assumed that the same initiating agent periodically re-transmits signals to be propagated across the plurality of agents. This may be desirable, for example, as part of an updating process to continually update the cumulative cost value retained at each agent in order to track changes in the area covered by the plurality of agents.

The signal processing step 204 may also include the use of time stamps in order to provide a mechanism to expire the cost values over time. As cost values are generated and retained in memory, they may be time stamped. The most recently retained time-stamped cost value can be used in processing the signal. However, after a predetermined time has elapsed, the retained cost values are removed from memory. The use of expiring cost values provides an advantage by ensuring that the cost value information is retained for a period of time, but that it also expires after a certain amount of time has passed, flushing obsolete information from the system.

In addition to simply storing the last cost value in memory, multiple cost values may be stored in memory in a stack-like configuration, with the cost values ranked (or accessed) in an order. The order of the cost values may, for example be highest to lowest or vice-versa, or some other ranking criteria may be used. In this scenario, newly received cost values are time stamped and stored in memory. When the current cost value expires, the next best cost value stored in memory is used until it expires, and so on as long as cost values are remain in memory. This mechanism allows for the cost values stored in memory to follow a quasi-decaying behavior before being erased.

The agents may be equipped with a means for determining the direction from which a signal has been received. This may be accomplished by using a directional signaling mechanism such as a plurality of directional infrared transceivers or directional radio receivers. Agents so equipped can store both the direction and the cost value related to a signal path to a neighboring agent. Rather than searching through neighboring agents for the one with the best cost value in order to determine the optimal path to the initiating agent, each agent can store the direction to the next agent along the path. The direction from which a signal was received can also factor into the cost value. For example, paths that lead in a particular heading may be less desirable than those that lead in other headings. Thus, the direction can be factored into a cost value in order to either increase or decrease the cost of a path in a certain direction. The agents 100 can also incorporate a mechanism for determining location and direction, in world coordinates, such as a global positioning system (GPS) receiver and a compass to help facilitate direction determination.

Multiple initiating agents may be used, and paths to each may be compared in order to determine which is better. For example, in the case where agents are distributed through an area known to have several land mines, it may be desirable to trigger the initiation of the propagation of a signal based on the detection of a mine near one or more agents. Each agent may then initiate the propagation of a signal with a cost value. At each agent, the cost values of signals initiating from each of the initiating agents may be compared in order to determine not only the optimal path to each, but the overall optimal path. As a result, although multiple land mines may be present among the agents, the optimal path to any land mine may be determined. In this case, it may be desirable to use a unique identifier to indicate the cost value along the path to each initiating agent at each agent in the plurality of agents. The cost value of the path to each initiating agent may then be compared at each agent to determine the best path among them. The cost values may be passed along separately for each path to each initiating agent, or they may be compared, and only the best passed along. In other words, each agent in the plurality of agents may either receive and retain cost values for the path to each initiating agent or may retain only the best cost value received.

Figure 3:
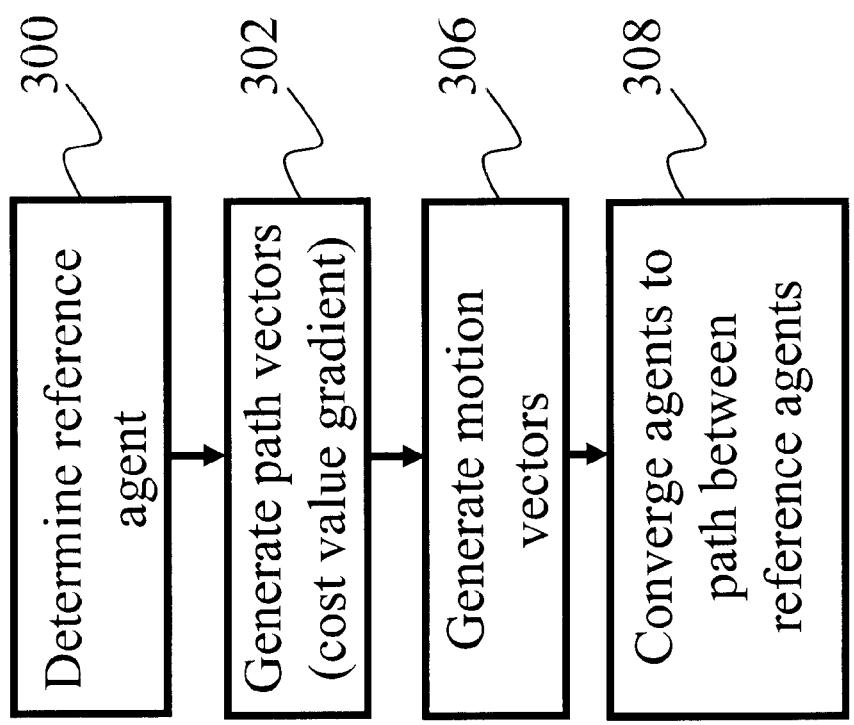
FIG. 3 is a flow diagram depicting additional steps in the method that are utilized to align agents along a path between two reference agents.

In addition to simply identifying paths from an arbitrarily selected agent to an initiating agent, there may be cases where it may be desirable to take advantage of a path between two agents. For example, it may be desirable to line up agents along a path between two reference agents. A flow diagram demonstrating the steps utilized for lining up agents along a path is depicted in FIG. 3. First, it is first necessary to determine two agents from among the plurality of agents to act as reference agents in a reference agent determining step 300. Next, a signal is transmitted from each of the reference agents. The transmission of the signal and the generation of the path vectors are generally indicated as a cost gradient generating step 302. Over the whole of the plurality of agents, the path vectors create, in essence, a cost value gradient over the area covered by the plurality of agents and toward the initiating agents. The path vectors are then utilized to create a motion vector in a motion vector generating step 306. Generally, each motion vector represents a sum of the path vectors, although a mechanism other than simply creating a sum could be used. The agents are urged to move along the motion vector, which is continually updated, until they are positioned along a path between the two reference agents in an agent converging step 308. As the agents move closer and closer to the path between the two reference agents, the motion vector becomes smaller and smaller, with the path vector components becoming closer and closer to being oppositely opposed. As with the designation of initiating agents, the designation of reference agents may take place either explicitly by user command or implicitly by an agent-detected event.

Once the agents are lined up along the path between two reference agents, other agent actions are possible. For example, it may be desirable for the agents to converge to a choke point along the path between the two agents. Specifically, in the case where the agents are designed to detect a fire inside a building and to deliver fire retardant in the best possible manner to stop the fire, it may be desirable to use parts of the physical structure of the building in order to maximize the impact of the retardant. Narrow passages may be well-suited for the delivery of retardant to achieve the greatest degree of effectiveness. Thus, it is possible to determine two reference agents residing on either side of a narrow passage, then to cause the other agents to line up on a path between the reference agents. Next, it would be desirable to have the lined up agents search, along the path, to determine the agent with the smallest degree of freedom with respect to movement. That agent could be assumed to be in the narrowest part of the passage, and the other agents could be urged toward that agent, thus resulting in a local clustering of agents near the convergence agent. The agents could then deliver their fire retardant into the narrow passageway with maximum effectiveness. In cases using a line of sight communication system, detection of the narrowest part of the path could also be achieved by determining the agent along the path receiving the smallest number of transmissions from neighboring agents or by determining the agent receiving transmissions over the smallest angular range.

Illustrations of the Present Invention

Several illustrative diagrams depicting various aspects of the present invention are presented in order to provide a more thorough understanding of its use. First, a diagram contrasting the present invention with conventional map-based approaches to terrain reasoning is depicted in FIG. 4. Next, an illustration of the use of cost values along paths to determine paths to a target from a start agent is depicted in FIG. 5. An example of the use of two distinct signal types for detecting two different targets is shown in FIG. 6. The alignment of agents along a path between two reference agents and convergence to choke points are depicted in FIG. 7 and FIG. 8, respectively.

Referring now to FIG. 4, FIG. 4(*a*) depicts a conventional means for mapping a space by using a few powerful mobile robots or sensors 400 moving through an environment 402 in a search pattern, sending raw or partially processed data back to a central computing resource 404. The central computing resource 404 then compiles a map 406 and can then utilize the map for other operations. Dynamic changes to the environment are not picked up unless the robots 400 repeat their search. In contrast, the technique afforded by the present invention, as depicted in FIG. 4(*b*) externalizes the map, spreading it across a collection of simple agents 100, each of which determines terrain features in its locality. Global properties including shortest routes, blocked routes, and contingency plans can be computed in a robust, distributed manner, with each member of the plurality of agents 100 contributing to the result. Utilizing the present invention, a distributed group of agents 100 are embedded in the environment in order to perform both sensing and computation tasks simultaneously. As previously mentioned, the agents 100 may be placed into the environment by a variety of means, either randomly or by specific placement. Advantages of using agents 100 spread over an environment include fault tolerance and responsiveness to dynamic changes in the environment. Also, the present invention affords the use of many relatively small, cheap agents 100 spread throughout an environment rather than a few very expensive robots. Thus, many simple agents 100 may be employed in an environment with very simple individual computing abilities in order to detect dynamic changes therein. Because many agents 100 are used, the loss of a single agent 100 has little impact on the overall computational ability, thus ensuring a high degree of fault tolerance. Furthermore, communication is only required between nearest neighbor agents, so there is no need for high-power communication devices. Information is either passed back to a user 408 by relaying messages, or the user can get data from nearby robots as the user moves through the environment. In addition, the agents 100 may be equipped with a means for providing movement in order to allow them to actively spread over and search an environment. It is important to note that having multiple small processors spread through the environment also allows for an improvement in computation speeds to the extent that computations can be decoupled and parallelized. Path planning using a pre-existing terrain database takes O(n log n) time for a single computer, but takes O(n) time, at worst, for a network. Finding the best terrain point, where the quality of a point can be determined locally, takes O(n) for a single processor, but O(log n) for a network, where most of the time is for consolidating the results. Thus, for large amounts of data, the use of multiple processors in a distributed network significantly reduces computation time.

Figure 5A:
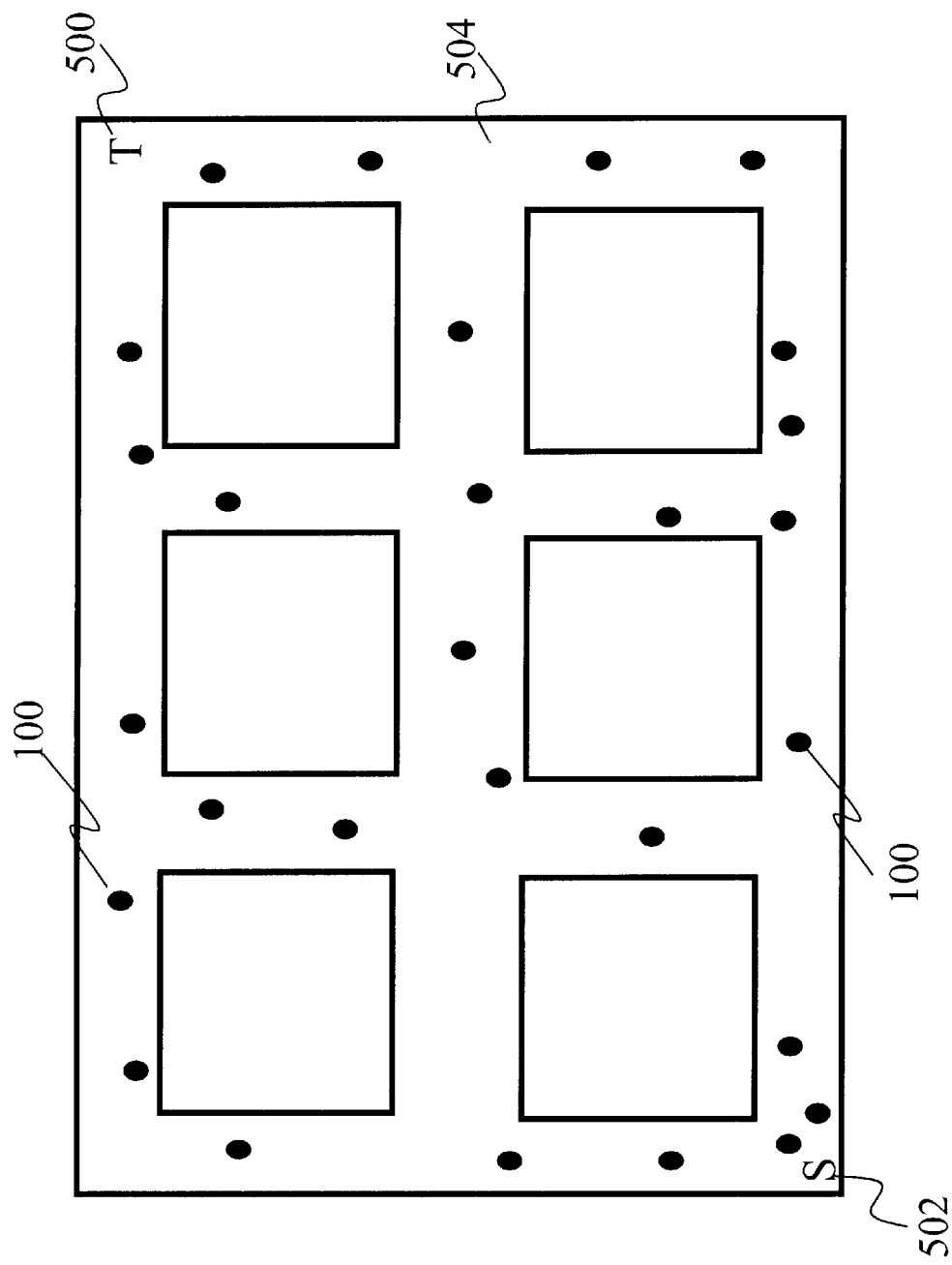
FIG. 5(a) is a topographical diagram depicting an agent swarm diffusing into a building with several members finding the target.
Figure 5B:
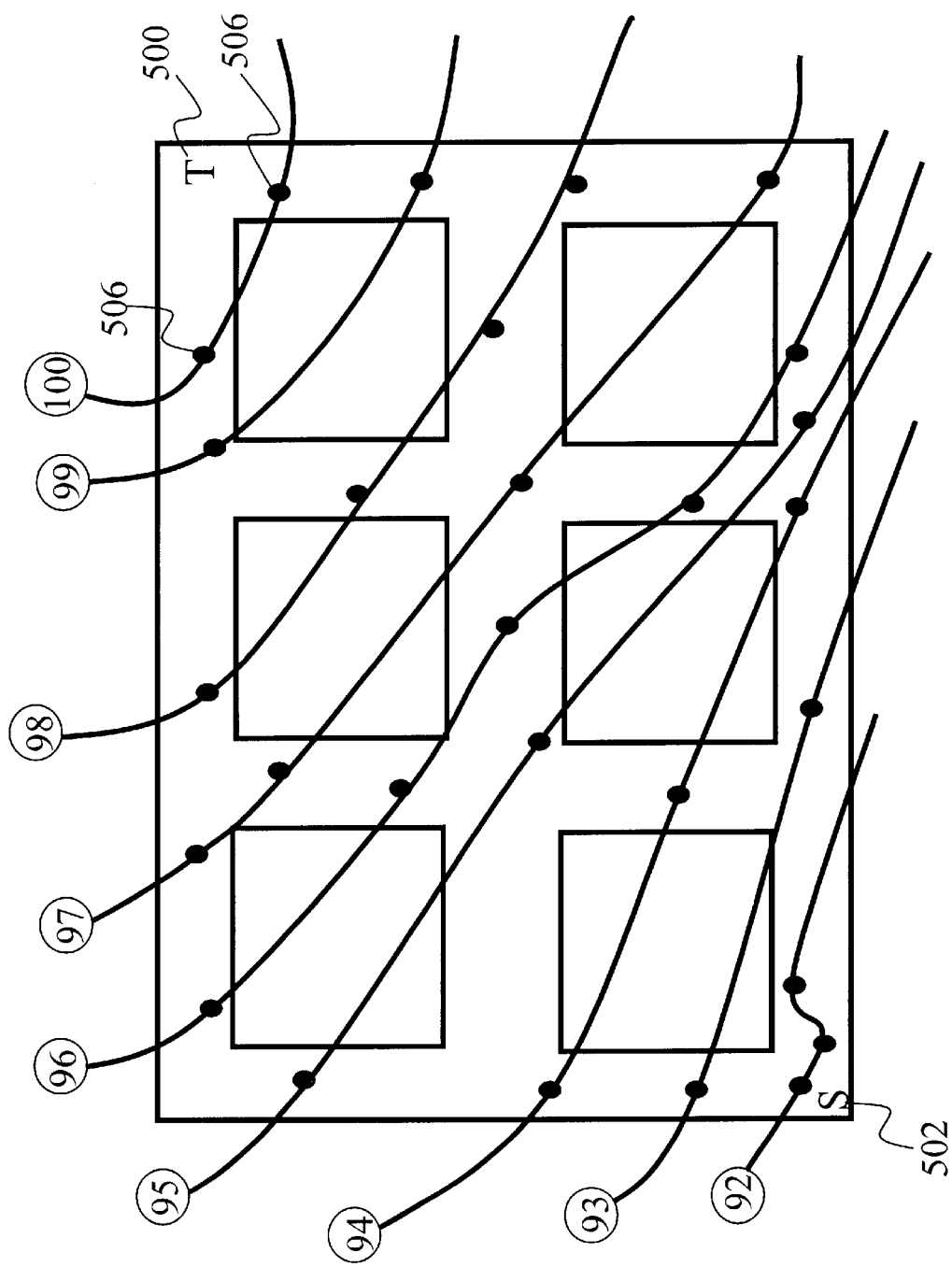
FIG. 5(b) is an illustrative diagram depicting a message propagating as a gradient with its cost-value encoding the distance to the target.

An illustration of the use of cost values along paths to determine paths to a target from a start agent is depicted next in FIG. 5. The present invention may be used to determine the best path to a target 500 from a starting point 502 within the interior of a building 504. In the example depicted, the application is the reconnoitering of a building interior and locating a target. FIG. 5(a) is a topographical diagram depicting a swarm of agents 100 that has spread throughout a building 504 with several members finding the target 500. Note that the agents 100 have achieved a roughly uniform spacing in the building 504. In this case, the agents 100 include sensors appropriate for detecting the target. For example, if the target 500 is an intruding person, sensors may be provided for detecting body heat, motion, and noise. An illustrative diagram depicting a message propagating like a gradient with its cost value encoding the distance to target is shown in FIG. 5(b). Upon detecting the target T 500, the initiating agents 506, which are those agents closest to the target T 500, transmit a signal with a zero-cost value of 100. This example depicts the cost values starting at 100 and decrementing with each hop away from the initiating agents 506. The cost values could just as easily be incremented with each hop from the initiating agents 506, or, as mentioned previously, could change by a factor representing a local sensor measurement. This could be the distance to the transmitting agent, estimated from the signal strength of the received message.

In this example, use of line of sight communication between agents is desirable so that internal structures such as walls and doors are incorporated into the representation of the structure. Neighboring agents within line of sight of the initiating agents 506 receive a signal from the initiating agent 506, decrement the cost value, generate a new signal incorporating the decremented cost value, and transmit the new signal as if they were the initiating agent. Iso-intensity cost value lines where all agents along the line exhibit the same cost value are depicted by the lines starting with 100 and decreasing to 92 from the initiating agents 506 to the agents nearest the starting point 502. This demonstrates how the cost values across the plurality of agents form a gradient-like map. In this case, the lines depict the gradient of signals propagating away from the target, with the propagation of cost values being identical to the propagation of distance information in Dijkstra's shortest-path algorithm. Since the line-of-sight communications are inherently linked to traversability within the building, cost values reflect approximate traversal distances to the target. All agents lying on an iso-intensity line are approximately the same distance from the detected target T 500. By following the agents up the cost value gradient, one can expect to find the most efficient path to the target.

Figure 5C:
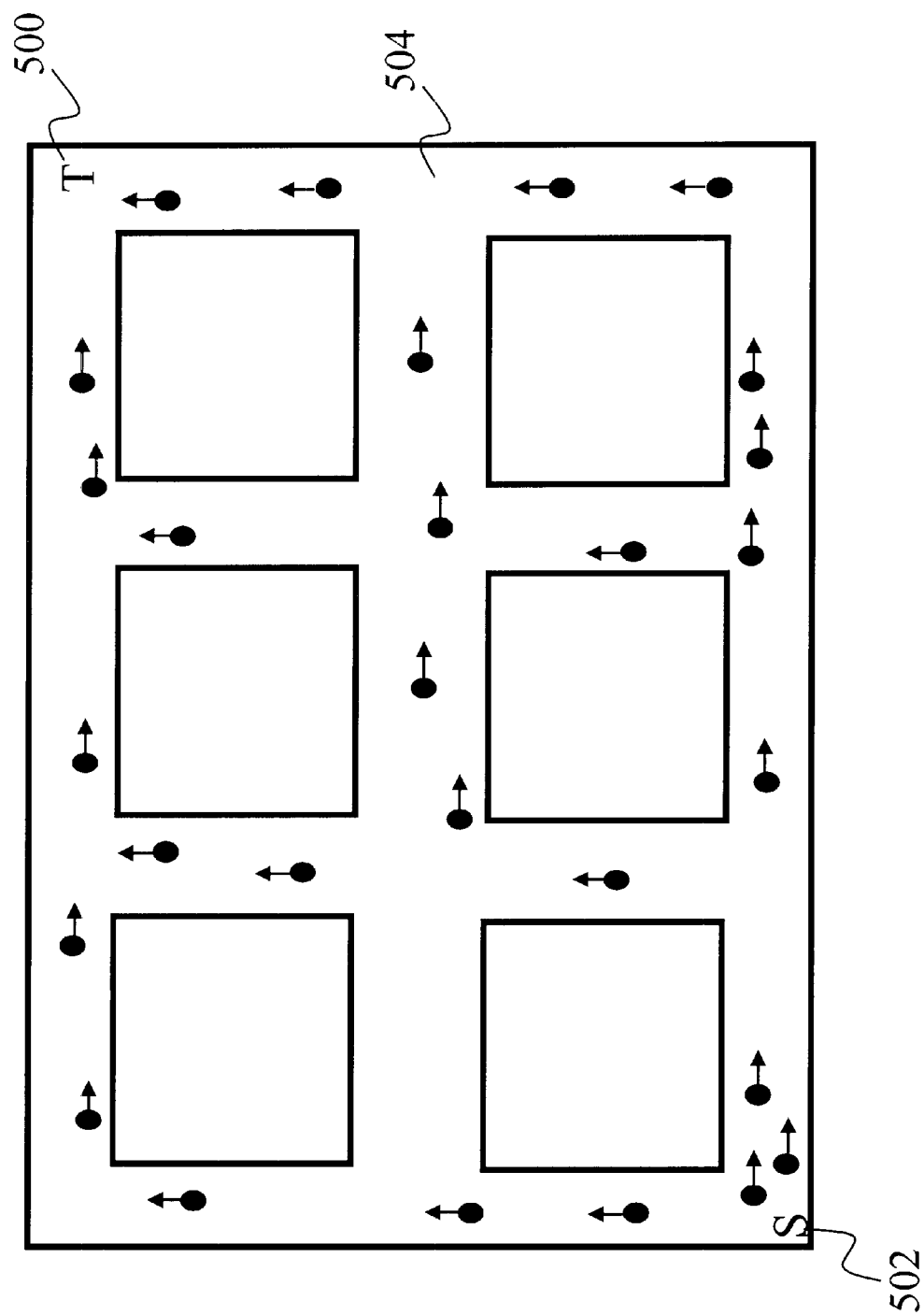
FIG. 5(c) is a diagram depicting agents signaling the direction to the target based on cost value messages, creating a directed path to the target.
Figure 6B:
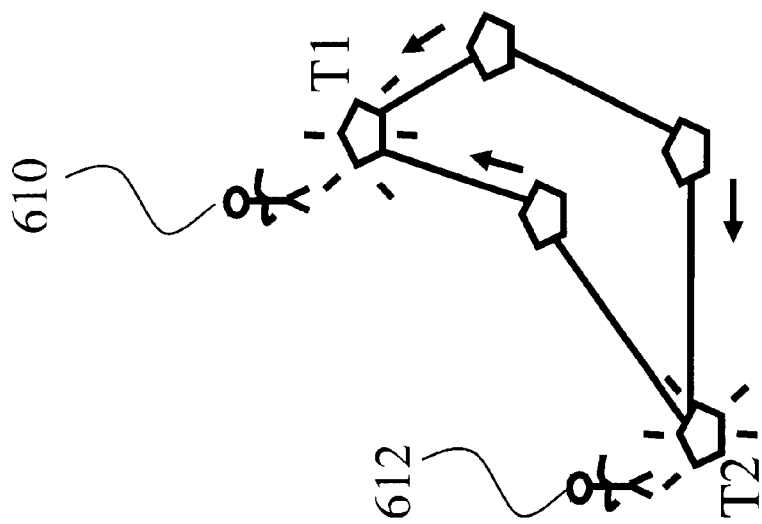
FIG. 6(b) is a diagram that depicts using one message type wherein each agent indicates direction to the nearest target.

It may also be desirable to provide the agents 100 with a means for detecting the direction from which a received message emanated. Whenever a new message is received, the cost value is updated and the corresponding direction to the source of the message is saved. Using this information, it is possible for each agent to indicate the local direction that best leads toward the target. A diagram depicting agents signaling the direction to the originator based on cost value messages and creating a directed path to the target is shown in FIG. 5(c). The information can provide a user beginning at the start point 502 with a path leading the user to the target T 500, while incorporating information about the target location and pathways within the building 504.

Figure 6A:
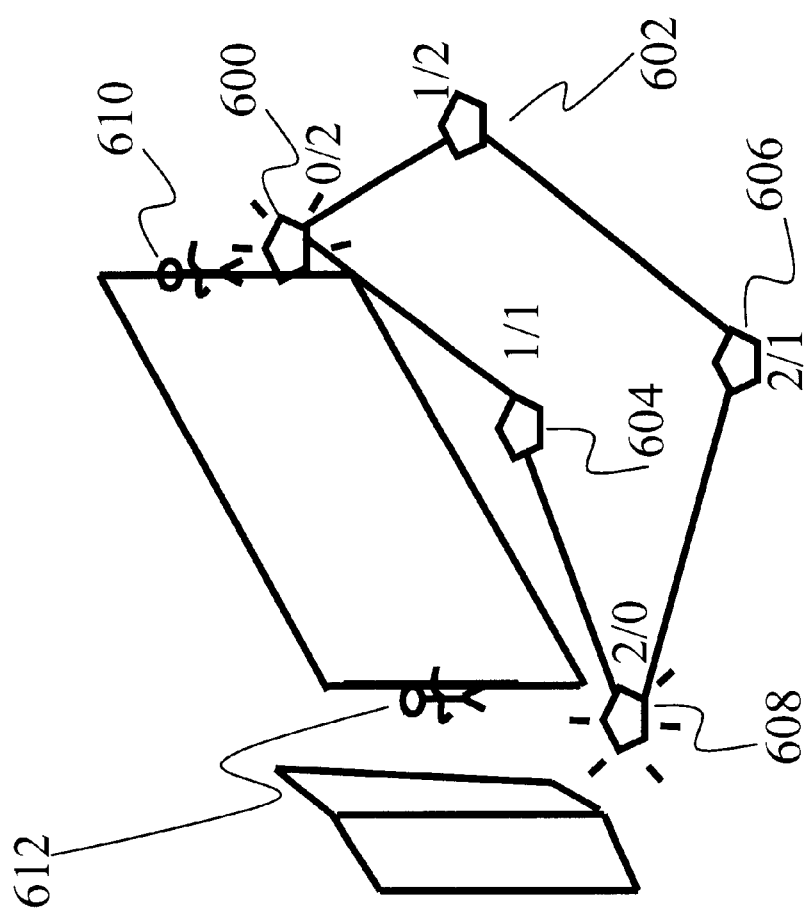
FIG. 6(a) is a diagram that depicts using two message types that allow each agent to determine which target is nearest.
Figure 7:
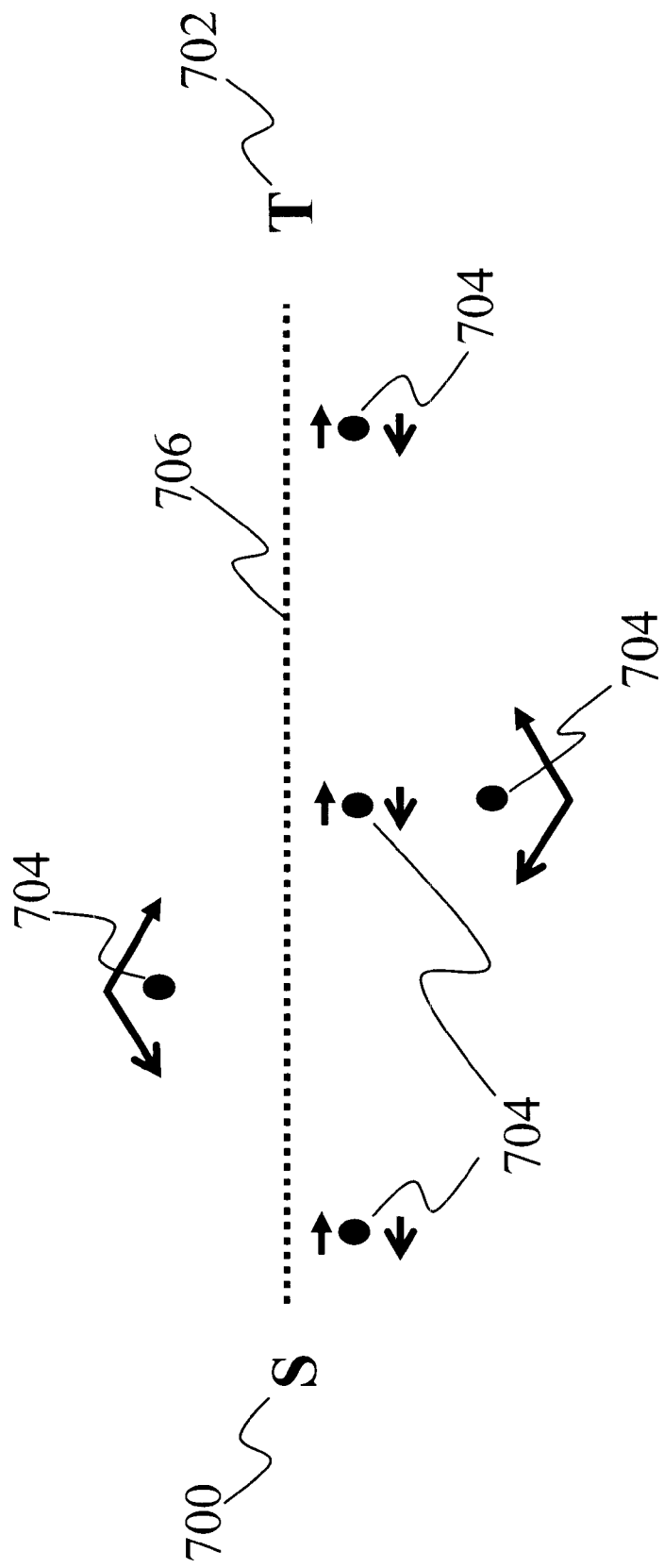
FIG. 7 is an illustration depicting the use of path vectors to align agents along a path between two reference agents.

An example of the use of two distinct signal types for detecting two different targets is shown in FIG. 6. Note that although using two distinct signal types in relation to FIG. 6, any number of signal types may be used, with each signal type forming a distinct cost value gradient. The cost value gradient may include a distance and a direction between each agent and a target or multiple targets. The use of two message types to allow each agent 100 to determine which target is nearest is shown in FIG. 6(a). Agents 600, 602, 604, and 608 each detect whether the first target 610 or the second target 612 is nearest. This allows a user to determine which target is closest. In this case agent 600 detects the first target 610. The resulting distances to the first target 610 are calculated by each of the other agents 602, 604, 606, and 608. At the same time, agent 608 detects the second target 612. The resulting distances to the second target 612 are also calculated by each of the other agents 602, 604, 606, and 608. A distinct message type may be used for each target. The distances, in terms of hops, are shown for each agent, separated by a slash, with the first distance indicating the distance from the first target 610 and the second distance indicating the distance from the second target 612. With the use of distinct message types for each target, one can simply compare the cost values at each agent to determine which target is closest to that agent.

As an alternative, a diagram that depicts using one message type wherein each agent indicates direction to the nearest target is shown in FIG. 6(b). In this case, the same message type may be used for both targets, and each agent will save only the distance to the closest agent. As depicted in FIG. 6(b), it is be helpful to use a messaging scheme that retains directional information as discussed above so that the direction to the closest target can also be found.

The alignment of agents along a path between two reference agents and convergence to choke points are depicted in FIG. 7 and FIG. 8, respectively. As shown in FIG. 7, a starting agent 700 and a target agent 702 are designated as reference agents. The reference agents each emit distinct message types to the other agents. The other agents 704 generate path vectors toward each of the reference agents. The path vectors are then used to generate a movement vector for each of the other agents 704, along which the other agents 704 can move in order to line up on a path 706 between the starting agent 700 and the target agent 702. Note the arrows, which represent the path vectors between the agents 704 and the reference agents. As the agents 704 move toward the path 706, the path vectors are updated, until the agents 704 reach the path and the vectors are aligned parallel to the path 706 in opposite directions toward the starting agent 700 and the target agent 702.

Figures 8A, 8B, 8C:
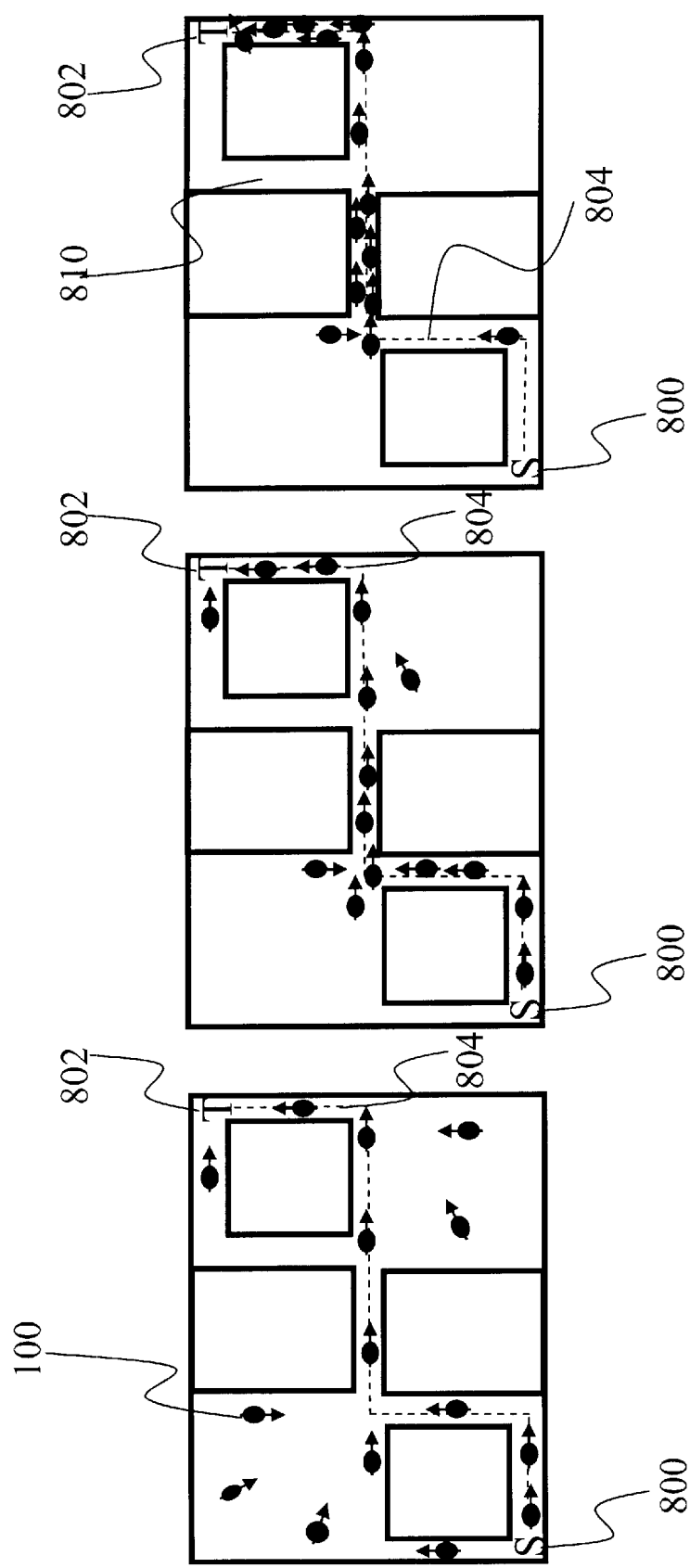
FIG. 8(a) is an illustration of the creation of a path between two reference agents and the generation of motion vectors from path vectors in order to urge other agents to the path in order to prepare to converge the other agents to choke points along the path.
FIG. 8(b) is an illustration of the path between the reference agents once the agents have aligned along the path.
FIG. 8(c) is an illustration of the agents after they have converged to choke points along the path.

The illustration presented in FIG. 8 utilizes the selection of reference agents and the alignment of other agents along a path between them in order to prepare the agents to converge along choke points. Although convergence along choke points may take place without first aligning the agents along a path between the reference agents, the alignment along the path provides a greater density of agents along the path in order to allow for a finer detection of properties along the path for selection of the proper choke point. As depicted in FIG. 8(a), an agent at starting point 800 and an agent at a target point 802 are designated as reference agents, with the path 804 between them designated by a dotted line. In this case, the agents 100 move toward a point along the path 804 closest to them as indicated by the arrows on the agents 100. In FIG. 8(b), the agents have almost all aligned along the path 804. In this case, blocking of the narrowest areas between the starting point and the target point is considered desirable as is blocking areas closest to the target point. Thus, two choke points 806 and 808 are designated and the agents converge to each. Note that the criteria used for determining the choke points in this case were (1) the narrowness of the corridor (area) and (2) closeness of the corridor to be blocked to the target point. Thus, agents converge first on choke point 806 until no more agents fit into the area, and then on choke point 808. Note that another narrow path area 810 exists near the target point 802. However, because the area 810 was not along the path between the starting point 800 and the target point 802, no agents converge there. An area for convergence may be selected in many different ways based on many different criteria. For example, although narrowness may be a criterion for blocking an area, steepness may be a criterion against blocking an area. Thus, once an area becomes sufficiently steep, the fact that it is narrow may not matter, and it may not need to be blocked.

All logic related to the incorporation of the present invention is typically embodied in the form of software stored in the memory of the agent and operated on by the processor. However, rather than using software, the logic of the present invention may be fixed in hardware as well. In order to provide a more full explanation of the software and its preferred embodiments, a compact disk has been provided as an appendix to this application, and includes software which performs several of the functions described herein.

What is claimed is:

1. A method for computing properties of a physical environment using a plurality of agents deployed within the physical environment, wherein each agent comprises, a communication capability, a processor coupled with the communication capability, and a memory connected with the processor, and wherein the plurality of agents make use of physical properties of inter-agent communication in order to form a distributed representation of non-local properties of the physical environment, the method comprising the steps of:
   a. triggering at least one initiating agent;
   b. transmitting a signal from the initiating agent to agents neighboring the initiating agent;
   c. processing the signal at each of the neighboring agents with a cost value based on local properties along the respective path between the initiating agent and each neighboring agent;
   d. selecting, from the signals received, a new signal to transmit;
   e. treating the neighboring agent as an initiating agent of the processed signal, and repeating the transmitting and processing steps; and
   f. at each agent, locally retaining at least one cumulative cost value representing information regarding non-local properties of the physical environment based on signals received.

2. A method for computing properties of a physical environment as set forth in claim 1, wherein in the processing step, the cost value is a hop count and where the hop count is incremented at each agent in the processing step to generate, at each agent, a cumulative hop count from the initiating agent.

3. A method for computing properties of a physical environment as set forth in claim 1, wherein the cumulative cost value is used in the determining step to determine, from the signals received, the new signal to transmit.

4. A method for computing properties of a physical environment as set forth in claim 3, wherein signals are periodically propagated across the plurality of agents from the initiating agent, wherein cost values retained from past signals are compared with a cost value from a current signal in order to determine the cost value with which to process the signal.

5. A method for computing properties of a physical environment as set forth in claim 3, wherein the communication paths between the agents are line of sight paths, whereby transmission of signals across the line of sight path is used to provide a representation of traversability along the paths.

6. A method for computing properties of a physical environment as set forth in claim 3, wherein the agents include means for storing the direction from which a particular signal was received across a communication path, and method further includes the step of comparing cost values for different paths between two agents and the step of storing the direction of the path with the best cost.

7. A method for computing properties of a physical environment as set forth in claim 4, wherein the step of processing the signal further comprises the additional sub-steps of:
   a. time-stamping cost values as they are retained in memory;
   b. designating the most recently retained time-stamped cost value for use in processing the signal; and
   c. removing the time-stamped cost values from memory after a predetermined time has elapsed.

8. A method for computing properties of a physical environment as set forth in claim 7, wherein in retaining cost values in memory, a plurality of cost values are recorded and ranked from best to worst over time; wherein the best cost value is designated for use in processing the signal; and wherein when the time stamp of a cost value designated for use in processing the signal expires and the cost value is removed from memory, the next best cost value is designated for use in processing the signal.

9. A method for computing properties of a physical environment as set forth in claim 1, wherein the method further comprises an agent alignment step, where the agent alignment step comprises the sub-steps of:
   a. selecting two agents from among the plurality of agents to act as reference agents;
   b. generating cost gradients comprising vector representations of an optimal cost path between each agent among the plurality of agents and each reference agents;
   c. summing the vectors at each agent to create a motion vector for the agent; and
   d. moving the agents along the motion vector in order to align the agents along a path between the reference agents.

10. A method for computing properties of a physical environment as set forth in claim 9, wherein the agent alignment step is triggered upon the occurrence of a triggering event.

11. A method for computing properties of a physical environment as set forth in claim 9, wherein the agent alignment step comprises the sub-steps of:
   a. selecting a convergence agent; and
   b. urging the other agents toward the convergence agent, resulting in a local clustering of agents near the convergence agent.

12. A method for computing properties of a physical environment as set forth in claim 1, wherein the agents further include at least one sensor connected with the processor, with the sensor providing an output, and wherein cost value used in the signal processing step is developed using the output of the sensor.

13. A method for computing properties of a physical environment as set forth in claim 12, wherein the cost value is used in the determining step to determine from the signals received the new signal to transmit.

14. A method for computing properties of a physical environment as set forth in claim 13, wherein signals are periodically propagated across the plurality of agents from the initiating agent, including a current signal and at least one past signal, wherein cost values retained from past signals are compared with a cost value from the current signal in order to determine the cost value with which to process the signal.

15. A method for computing properties of a physical environment as set forth in claim 13, wherein the agents include means for storing the direction from which a particular signal was received across a communication path, and method further includes the step of comparing cost values for different paths between two agents and the step of storing the direction of the path with the best cost.

16. A method for computing properties of a physical environment as set forth in claim 14, wherein the step of processing the signal further comprises the additional sub-steps of:
   a. time-stamping cost values as they are retained in memory;
   b. designating the most recently retained time-stamped cost value for use in processing the signal; and
   c. removing the time-stamped cost values from memory after a predetermined time has elapsed.

17. A method for computing properties of a physical environment as set forth in claim 16, wherein in retaining cost values in memory, a plurality of cost values are recorded over time; and in the removing the time-stamped cost values from memory, another historic cost value is selected for adjusting the cumulative cost value message.

18. A method for computing properties of a physical environment as set forth in claim 13, wherein the communication paths between the agents are line of sight paths, whereby transmission of signals across the line of sight path is used to provide a representation of traversability along the paths.

19. A method for computing properties of a physical environment as set forth in claim 12, wherein the method further comprises an agent alignment step, where the agent alignment step comprises the sub-steps of:
   a. selecting two agents from among the plurality of agents to act as reference agents;
   b. generating cost gradients comprising vector representations of an optimal cost path between each agent among the plurality of agents and each reference agents;
   c. summing the vectors at each agent to create a motion vector for the agent; and
   d. moving the agents along the motion vector in order to align the agents along a path between the reference agents.

20. A method for computing properties of a physical environment as set forth in claim 19, wherein the agent alignment step is triggered upon the occurrence of a triggering event.

21. A method for computing properties of a physical environment as set forth in claim 20, wherein the agent alignment step comprises the sub-steps of:
   a. selecting a convergence agent; and
   b. urging the other agents toward the convergence agent, resulting in a local clustering of agents near the convergence agent.

22. An agent for use among a plurality of agents deployed within the physical environment for computing properties of a physical environment, the agent comprising:
   a. a communication capability for communicating with other, locally spaced agents from among the plurality of agents;
   b. a processor coupled with the communication capability to generate a local cost value from the physical properties along the paths between the agent and each of the other locally spaced agents, to combine the local cost values with respective non-local cost values received in communication with each of the other locally spaced agents in order to generate cumulative cost values, to determine the best of the cumulative cost values, and to generate a new signal incorporating the best cumulative cost value for transmission to other locally spaced agents; and
   c. a memory connected with the processor for retaining the best cumulative cost value, whereby the plurality of agents make use of physical properties of inter-agent communication in order to form a distributed representation of non-local properties of the physical environment, wherein at least one of the agents among the plurality of agents is designated as an initiating agent and propagates a signal across the plurality of agents, with the signal updated to incorporate the best cumulative cost value as it is propagated across the plurality of agents and away from the initiating agent, whereby a representation of the best path to the initiating agent is stored at each agent among the plurality of agents.

23. An agent for use among a plurality of agents deployed within the physical environment for computing properties of a physical environment as set forth in claim 22, wherein in the non-local cost value is a hop count from an initiating agent, wherein the local cost value is an increment of the hop count, and wherein the cumulative cost value is generated in the processor by summing the best non-local cost value received at the agent with the local cost value, to produce an incremented hop count.

24. An agent for use among a plurality of agents deployed within the physical environment for computing properties of a physical environment as set forth in claim 22, wherein the cumulative cost value is used in the processor to determine, from the signals received, the best cumulative cost value for transmission to other locally spaced agents.

25. An agent for use among a plurality of agents deployed within the physical environment for computing properties of a physical environment as set forth in claim 24, wherein signals are periodically propagated across the plurality of agents from an initiating agent, and wherein cumulative cost values retained in the memory of the agent are compared with a cumulative cost value generated from a newly received signal in order to determine the best cumulative cost value for transmission to other locally spaced agents.

26. An agent for use among a plurality of agents deployed within the physical environment for computing properties of a physical environment as set forth in claim 24, wherein the communication paths between the agents are line of sight paths, whereby transmission of signals across the line of sight path is used in the processor of the agent to generate a cumulative cost value representation of traversability along a path from an initiating agent to the agent.

27. An agent for use among a plurality of agents deployed within the physical environment for computing properties of a physical environment as set forth in claim 24, wherein the agent further includes, connected with the memory, a means for determining the direction from which a particular signal was received across a communication path, wherein the direction from which the signal with the best cost value was received is stored in the memory.

28. An agent for use among a plurality of agents deployed within the physical environment for computing properties of a physical environment as set forth in claim 25, wherein the processor is further operative to time stamp cumulative cost values as they are retained in memory; to designate the most recently retained time-stamped cumulative cost value for use in processing the signal; and to remove the time-stamped cumulative cost values from memory after a predetermined time has elapsed.

29. An agent for use among a plurality of agents deployed within the physical environment for computing properties of a physical environment as set forth in claim 28, wherein a plurality of cumulative cost values are recorded in memory over time, and wherein when removing the time-stamped cumulative cost values from memory, the processor causes another cumulative cost value from memory to be selected for adjusting the cumulative cost value message.

30. An agent for use among a plurality of agents deployed within the physical environment for computing properties of a physical environment as set forth in claim 22, wherein the agent furthers include at least one sensor connected with the processor, with the sensor providing an output, and wherein the local cost value is developed by the processor using the output of the sensor.

31. An agent for use among a plurality of agents deployed within the physical environment for computing properties of a physical environment as set forth in claim 30, wherein the cumulative cost value is used in the processor to determine, from the signals received, the best cumulative cost value for transmission to other locally spaced agents.

32. An agent for use among a plurality of agents deployed within the physical environment for computing properties of a physical environment as set forth in claim 31, wherein signals are periodically propagated across the plurality of agents from an initiating agent, and wherein cumulative cost values retained in the memory of the agent are compared with a cumulative cost value generated from a newly received signal in order to determine the best cumulative cost value for transmission to other locally spaced agents.

33. An agent for use among a plurality of agents deployed within the physical environment for computing properties of a physical environment as set forth in claim 31, wherein the communication paths between the agents are line of sight paths, whereby transmission of signals across the line of sight path is used in the processor of the agent to generate a cumulative cost value representation of traversability along a path from an initiating agent to the agent.

34. An agent for use among a plurality of agents deployed within the physical environment for computing properties of a physical environment as set forth in claim 31, wherein the agent further includes, connected with the memory, a means for determining the direction from which a particular signal was received across a communication path, wherein the direction from which the signal with the best cost value was received is stored in the memory.

35. An agent for use among a plurality of agents deployed within the physical environment for computing properties of a physical environment as set forth in claim 32, wherein the processor is further operative to time stamp cumulative cost values as they are retained in memory; to designate the most recently retained time-stamped cumulative cost value for use in processing the signal; and to remove the time-stamped cumulative cost values from memory after a predetermined time has elapsed.

36. An agent for use among a plurality of agents deployed within the physical environment for computing properties of a physical environment as set forth in claim 35, wherein a plurality of cumulative cost values are recorded in memory over time, and wherein when removing the time-stamped cumulative cost values from memory, the processor causes another cumulative cost value from memory to be selected for adjusting the cumulative cost value message.

* * * * *